United States Patent [19]

Niwa et al.

[11] Patent Number: 4,564,673

[45] Date of Patent: Jan. 14, 1986

[54] 3-CYANO-5-NITROTHIOPHENE ANILINO MONOAZO DYE FOR SYNTHETIC FIBERS

[75] Inventors: Toshio Niwa; Kiyoshi Himeno, both of Kanagawa; Shuichi Maeda, Saitama, all of Japan

[73] Assignee: Research Association Of Synthetic Dyestuffs, Tokyo, Japan

[21] Appl. No.: 554,112

[22] Filed: Nov. 21, 1983

[30] Foreign Application Priority Data

Nov. 22, 1982 [JP] Japan ................ 57-205259

[51] Int. Cl.$^4$ .............. C09B 29/033; C09B 29/08; D06P 1/18; D06P 3/54
[52] U.S. Cl. ................ 534/794; 534/640
[58] Field of Search .......... 260/152; 534/794, 753, 534/640

[56] References Cited

FOREIGN PATENT DOCUMENTS 48-84120  1/1973  Japan ................ 260/152

Primary Examiner—Floyd D. Higel
Attorney, Agent, or Firm—Oblon, Fisher, Spivak, McClelland & Maier

[57] ABSTRACT

A monoazo dye for synthetic fibers, particularly polyester fibers, which can dye the fiber clear blue with excellent fastness to sublimation, fastness to light, resistance for after finish and alkali discharge.

7 Claims, No Drawings

3-CYANO-5-NITROTHIOPHENE ANILINO MONOAZO DYE FOR SYNTHETIC FIBERS

BACKGROUND OF THE INVENTION

1. Field of the Invention

This invention relates to a monoazo dye for synthetic fibers and, more particularly, it relates to a monoazo dye which can dye polyester fibers clear blue with excellent fastness to sublimation, fastness to light, resistance for after finish and alkali discharge.

2. Description of the Prior Art

Japanese Patent Application (OPI) No. 84120/1973 discloses a dye having a structure similar to that of the dye of this invention. For example, Examples 89 and 90 thereof shows the dye represented by the formula

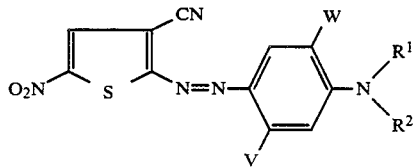

wherein V is OCH$_3$, W is NHCOCH$_3$, R$^1$ is H or C$_2$H$_5$ and R$^2$ is

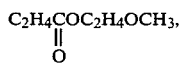

and a carboxylic acid ester substituted with lower alkoxy is described as R$^2$ which is a coupling component.

SUMMARY OF THE INVENTION

As a result extensive investigations, it has been found that a dye having a carboxylic acid ester substituted with phenyl as R$^2$ has a particularly excellent alkali discharge and also has fastness properties such as fastness to sublimation, fastness to light or fastness to water.

Accordingly, an object of this invention is to provide a water-insoluble azo dye represented by the formula

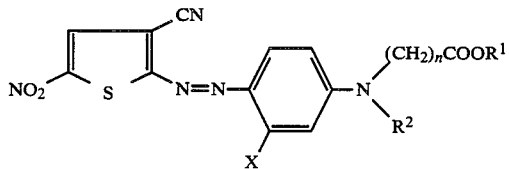

wherein X is hydrogen, methyl, acetylamino or chlorine, R$^1$ is phenyl, benzyl, phenethyl, phenoxymethyl or phenoxyethyl, n is an integer of 1, 2 or 3, and R$^2$ is alkyl having 1 to 4 carbon atoms, alkyl, alkoxyethyl having 1 to 4 carbon atoms in the alkoxy moiety or —(CH$_2$)$_n$COOR$^1$ wherein R$^1$ is the same as defined above.

DETAILED DESCRIPTION OF THE INVENTION

The dye represented by the formula (I) can be produced by coupling a diazonium salt of 2-amino-3-cyano-5-nitrothiophene with aniline derivatives represented by the formula

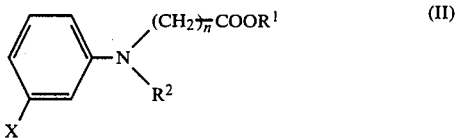

wherein X, R$^1$, R$^2$ and n are the same as defined above.

The representative examples of aniline derivatives represented by the formula (II) include N-methyl-N-(phenoxycarbonylmethyl) aniline, N-methyl-N-($\beta$-phenoxycarbonylethyl)aniline, N-ethyl-N-(benzyloxycarbonylmethyl)-m-toluidine, N-ethyl-N-($\beta$-benzyloxycarbonylethyl)-m-toluidine, N-methyl-N-(phenethyloxycarbonylmethyl)-m-toluidine, N-methyl-N-($\beta$-phenethyloxycarbonylethyl)-m-toluidine, N-butyl-N-(benzyloxycarbonylmethyl)aniline, N-ethyl-N-($\gamma$-phenoxycarbonylpropyl)aniline, N-($\beta$-methoxyethyl)-N-(benzyloxycarbonylmethyl)-m-toluidine, N-ethyl-N-[$\gamma$-($\beta$-phenoxyethoxy)carbonylpropyl]-m-toluidine, N-($\beta$-propoxyethyl)-N-(benzyloxycarbonylmethyl)aniline, N-propyl-N-[$\beta$-($\beta$-phenoxyethoxyl)carbonylethyl]aniline, 3-acetylamino-N-ethyl-N-(phenoxycarbonylmethyl)aniline, N-methyl-N-($\beta$-phenoxymethoxycarbonylethyl)aniline, 3-acetylamino-N-propyl-N-(phenethyloxycarbonylmethyl)aniline, 3-acetylamino-N-allyl-N-(benzyloxycarbonylmethyl)aniline, N-allyl-N-(benzyloxycarbonylmethyl)-m-toluidine, N,N-bis-[$\gamma$-($\beta$-phenoxyethoxy)carbonylpropyl]-m-toluidine, and 3-acetylamino-N-ethyl-N-[$\gamma$-($\beta$-phenoxyethoxy)carbonylpropyl]aniline.

Examples of the synthetic fibers which can be dyed with the dye of this invention include fibers comprising a synthetic polymer such as polyester, polyester ether, polyamide or polyurethane, fibers comprising a semi-synthetic polymer such as triacetate or diacetate, mixed fibers of the synthetic fibers, or mixed fibers of the synthetic fibers with natural fibers such as cotton, silk or wool. Of these fibers, fibers comprising polyesters such as a polyethylene terephthalate or a polycondensate of terephthalic acid and 1,4-bis(hydroxymethyl)cyclohexane are particularly preferred.

The synthetic fibers can be dyed with the dye of this invention in the manners such that the dye represented by the formula (I) is dispersed in an aqueous medium using a dispersing agent such as a condensate of naphthalene-sulfuric acid and formaldehyde, a higher alcohol sulfuric acid ester or a higher alkylbenzenesulfonate in the conventional manner to prepare a dye bath or a printing paste, and a dip dyeing or a printing is conducted. In the case of the dip dyeing, for example, the synthetic fibers can be dyed with good fastness by employing conventional dyeing treatment such as a high temperature dyeing method, a carrier dyeing method or a thermosol dyeing method. In some cases, an acidic substance such as formic acid, acetic acid, phosphoric acid or ammonium sulfate can be added to the dye bath, thereby obtaining better results.

This invention will now be described in more detail by reference to the following examples. However, this invention is not limited thereto.

EXAMPLE 1

0.5 g of a monoazo dye represented by the formula

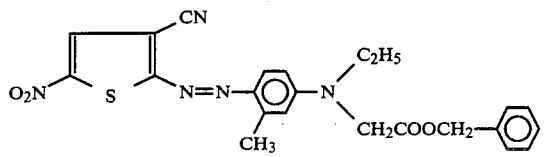

is dispersed in 3 liters of water containing 1 g of a naphthalenesulfonic acid-formaldehyde condensate and 2 g of a higher alcohol sulfuric acid ester to prepare a dye bath.

100 g of polyester fibers were dipped in the dye bath and dyed at 130° C. for 60 minutes. The dyed fibers were then soaped, washed with water and dried to obtain polyester cloth dyed clear blue and having excellent fastness to light, fastness to water and fastness to sublimation.

The dye used was prepared by diazotizing 2-amino-3-cyano-5-nitrothiophene in the conventional manner and coupling the resulting product with N-ethyl-N-(benzyloxycarbonylmethyl)-m-toluidine.

The dyed product had a $\lambda_{max}$ (acetone) of 607 nm.

EXAMPLE 2

0.5 g of a monoazo dye represented by the formula

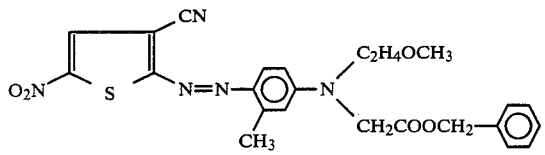

was dispersed in 3 liter of water containing 1.5 g of a naphthalenesulfonic acid-formaldehyde condensate and 1 g of a higher alcohol sulfuric acid ester, and 15 g of methylnaphthalene carrier was further added thereto to prepare a dye bath.

100 g of polyester fibers were dipped in the dye bath and dyed at 100° C. for 90 minutes. The dyed fibers were then soaped, washed with water and dried to obtain a polyester cloth dyed clear blue and having excellent fastness to light, fastness to water and fastness to sublimation.

The dye used was prepared by diazotizing 2-amino-3-cyano-5-nitrothiophene in the conventional manner and coupling the resulting product with N-β-methoxyethyl-N-(benzyloxycarbonylmethyl)-m-toluidine.

The dyed product had a $\lambda_{max}$ (acetone) of 603 nm.

EXAMPLE 3

Polyester fibers were dyed in the same manners as in Example 1 except that 0.5 g of a monoazo dye represented by the formula

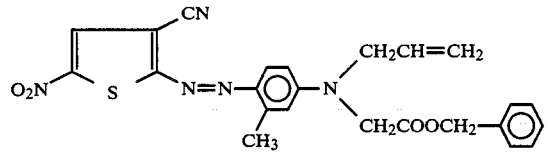

was used, to obtain a polyester cloth dyed clear blue and having excellent fastness to light, fastness to water and fastness to sublimation.

The dye used was prepared by diazotizing 2-amino-3-cyano-5-nitrothiophene in the conventional manner and coupling the resulting product with N-allyl-N-(benzyloxycarbonylmethyl)-m-toluidine.

The dyed product had a $\lambda_{max}$ (acetone) of 606 nm.

EXAMPLES 4 TO 31

Example 1 was followed except using a monoazo dye having the formula

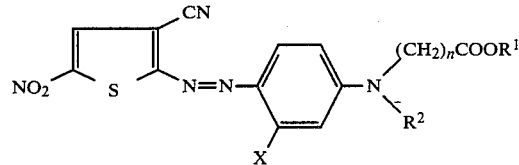

and as shown in the Table below, to obtain dyed products.

The results obtained are shown in the Table below.

The dyed products obtained had excellent fastness to light, fastness to water and fastness to sublimation.

TABLE

| Example | —X | —R$^1$ | —R$^2$ | n | $\lambda_{max}$ (Acetone) nm | Color Tone (Polyester) |
|---|---|---|---|---|---|---|
| 4 | —H | —⌬ (phenyl) | —CH$_3$ | 1 | 603 | Blue |
| 5 | —CH$_3$ | —CH$_2$CH$_2$—⌬ | " | 1 | 608 | " |
| 6 | —H | —CH$_2$—⌬ | —C$_4$H$_9$ | 1 | 595 | " |
| 7 | —CH$_3$ | " | —C$_3$H$_7$ | 1 | 608 | " |
| 8 | —H | " | —C$_2$H$_4$OC$_3$H$_7$ | 1 | 591 | " |

TABLE-continued
| Example | —X | —R¹ | —R² | n | $\lambda_{max}$ (Acetone) nm | Color Tone (Polyester) |
|---|---|---|---|---|---|---|
| 9 | —NHCOCH₃ | 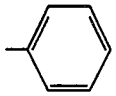 | —C₂H₅ | 1 | 609 | " |
| 10 | " | 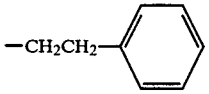 —CH₂CH₂— | —C₃H₇ | 1 | 610 | " |
| 11 | " | 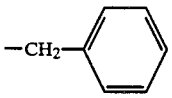 —CH₂— | —CH₂CH=CH₂ | 1 | 606 | " |
| 12 | —H | " | —C₂H₄OC₂H₅ | 1 | 591 | " |
| 13 | —CH₃ | " | —C₂H₄OC₄H₉ | 1 | 602 | " |
| 14 | —H | " | —CH₂CH=CH₂ | 1 | 592 | " |
| 15 | —NHCOCH₃ | " | —C₂H₅ | 1 | 609 | " |
| 16 | —H | 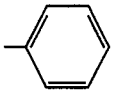 | —CH₃ | 2 | 604 | " |
| 17 | —CH₃ | 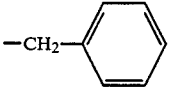 —CH₂— | —C₂H₅ | 2 | 613 | " |
| 18 | " | 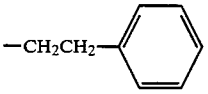 —CH₂CH₂— | —CH₃ | 2 | 610 | " |
| 19 | —H | 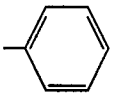 | —C₂H₅ | 3 | 609 | " |
| 20 | —CH₃ | 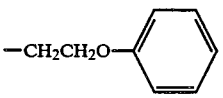 —CH₂CH₂O— | " | 3 | 609 | " |
| 21 | —H | " | —C₃H₇ | 2 | 605 | " |
| 22 | " | 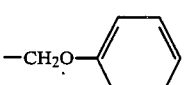 —CH₂O— | —CH₃ | 2 | 604 | " |
| 23 | —CH₃ | 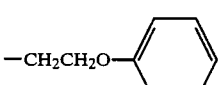 —CH₂CH₂O— | —C₃H₆COOC₂H₄O— 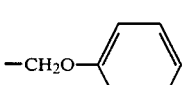 | 3 | 618 | " |
| 24 | —NHCOCH₃ | " | —C₂H₅ | 3 | 612 | " |
| 25 | " | " —CH₂O— | " | 1 | 601 | " |

TABLE-continued

| Example | —X | —R¹ | —R² | n | $\lambda_{max}$ (Acetone) nm | Color Tone (Polyester) |
|---|---|---|---|---|---|---|
| 26 | —H | —CH₂—C₆H₅ | —C₂H₄COOCH₂—C₆H₅ | 2 | 596 | " |
| 27 | " | —CH₂CH₂O—C₆H₅ | —C₂H₄COOC₂H₄O—C₆H₅ | 2 | 596 | " |
| 28 | " | —CH₂CH₂O—C₆H₅ | —C₃H₆COOC₂H₄O—C₆H₅ | 3 | 603 | " |
| 29 | —NHCOCH₃ | " | —C₂H₅ | 1 | 600 | " |
| 30 | —CH₃ | " | —CH₃ | 2 | 610 | " |
| 31 | —Cl | " | —C₂H₅ | 1 | 595 | " |

While the invention has been described in detail and with reference to specific embodiments thereof, it will be apparent to one skilled in the art that various changes and modifications can be made therein without departing from the spirit and scope thereof.

What is claimed is:

1. A monoazo dye represented by the formula

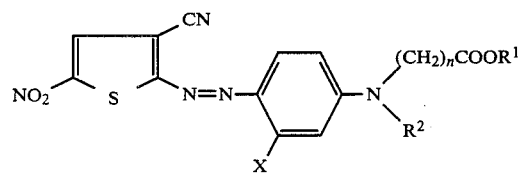

wherein X is hydrogen, methyl, acetylamino or chlorine, R¹ is phenyl, benzyl, phenethyl, phenoxymethyl or phenoxyethyl, n is an integer of 1, 2 or 3, and R² is alkyl having 1 to 4 carbon atoms, allyl, alkoxyethyl having 1 to 4 carbon atom in the alkoxy moiety or —CH₂)ₙCOOR¹ wherein R¹ is the same as defined above.

2. The monoazo dye as claimed in claim 1, wherein X is methyl or hydrogen, R¹ is phenyl, benzyl, phenethyl, phenoxymethyl or phenoxyethyl, n is an integer of 2 or 3, and R³ is alkyl having 1 to 4 carbon atoms.

3. The monoazo dye as claimed in claim 1, wherein X is methyl or hydrogen, R¹ is phenoxyethyl, n is 2, and R² is alkyl having 1 to 4 carbon atoms.

4. The monoazo dye of claim 1, wherein X is methyl, R² is ethyl, n is 1 and R¹ is benzyl.

5. The monoazo dye of claim 1, wherein X is methyl, R² is C₂H₄OCH₃, n is 1 and R¹ is benzyl.

6. The monoazo dye of claim 1, wherein X is methyl, R² is CH₂CH=CH₂, n is 1 and R¹ is benzyl.

7. The monoazo dye of claim 1, wherein X is NHCOCH₃, R¹ is phenyl, phenoxyethyl or benzyl, R² is ethyl, and n is 1 or 3.

* * * * *